Figure 1:
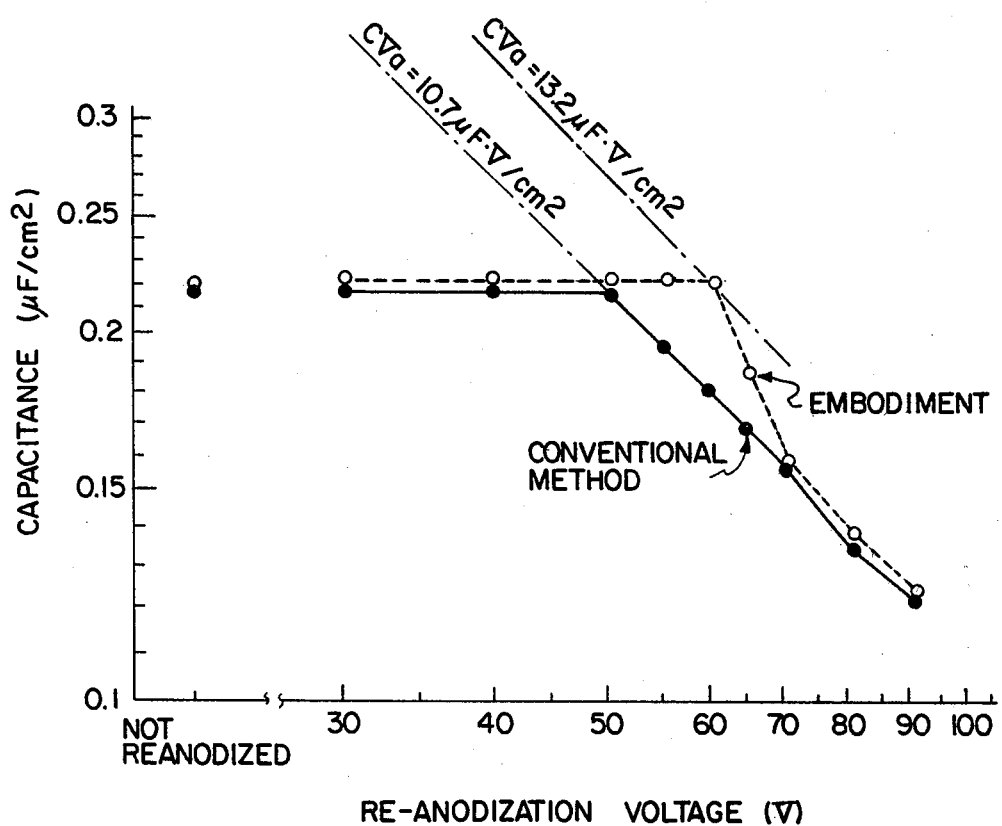

United States Patent [19]

Nakata et al.

[11] 4,450,049

[45] May 22, 1984

[54] METHOD OF FORMING TANTALUM CAPACITOR ANODES AND MAKING THE CAPACITORS

[75] Inventors: Koreaki Nakata, Takarazuka; Jiro Ueno; Yasuhiro Ogawa, both of Hirakata, all of Japan

[73] Assignee: Matsushita Electric Industrial Co., Ltd., Osaka, Japan

[21] Appl. No.: 359,837

[22] Filed: Mar. 19, 1982

[30] Foreign Application Priority Data

Mar. 19, 1981 [JP] Japan ................................ 56-11198
Aug. 20, 1981 [JP] Japan ............................... 56-131127

[51] Int. Cl.³ .......................... C25D 5/44; C25D 3/66; C25D 11/00
[52] U.S. Cl. ................................. 204/35 N; 204/42; 204/56 R; 204/39
[58] Field of Search ..................... 204/35 N, 42, 56 R, 204/39, 38 A; 29/570

[56] References Cited

U.S. PATENT DOCUMENTS

| | | | |
|---|---|---|---|
| 2,785,116 | 3/1957 | Bolton et al. | 204/56 R |
| 3,120,695 | 2/1964 | Burnham | 204/35 N |
| 3,239,436 | 3/1966 | Hagiwara et al. | 204/39 |
| 3,279,030 | 10/1966 | Wagner et al. | 204/38 A |
| 3,373,093 | 3/1968 | Every | 204/39 |

*Primary Examiner*—G. Ozaki
*Assistant Examiner*—Gerard P. Rooney, Jr.
*Attorney, Agent, or Firm*—Wenderoth, Lind & Ponack

[57] ABSTRACT

A solid tantalum electrolytic capacitor is formed by a method comprising anodizing a tantalum sintered body for substantial dielectric film growth in a substantially aqueous electrolyte;

anodically treating said anodized tantalum body in at least one fused salt selected from the group of nitrates of alkali metals, nitrates of alkaline earth metals and nitrites of alkali metals with an applied voltage which is as high as possible but within a range wherein capacitance-decrease of the anode formed in the aqueous electrolyte is not caused; and anodically treating said fused salt-treated tantalum body in a substantially aqueous electrolyte with an applied voltage which is as high as possible but within a range wherein re-anodization will not occur, the temperature of said fused salt being in the range of 250° C. to 350° C.

3 Claims, 2 Drawing Figures

METHOD OF FORMING TANTALUM CAPACITOR ANODES AND MAKING THE CAPACITORS

This invention relates to a method of forming a dielectric film having improved breakdown voltage on a tantalum capacitor anode and of making an electrolytic capacitor therewith.

Heretofore, the dielectric oxide film of tantalum electrolytic capacitors has been formed, as is well known in the art, by anodization in a substantially aqueous electrolytic solution such as a phosphoric acid solution. A tantalum electrolytic capacitor comprises a tantalum anode coated with tantalum oxide dielectric film on the surface, and electrolyte solution (in the wet type) or manganese dioxide as an electrolyte (in solid type) and a counter electrode. The breakdown voltage of solid electrolytic capacitors or the voltage at which re-anodization starts in wet-type electrolytic capacitors depends on that of the dielectric oxide film of the capacitor.

Achieving an increase in breakdown voltage of solid electrolytic capacitors or the voltage at which re-anodization starts in wet electrolytic capacitors without decreasing capacitance of the capacitors has been desired in order to save the expensive material tantalum. For example, U.S. Pat. No. 4,131,520 and U.S. Pat. No. 4,278,513 discloses improvements in breakdown voltage of sintered anodes of electrolytic capacitors by using a two-stage formation process in which the outer surface of the sintered anode is anodized to a higher voltage than the rest of the anode in order to increase breakdown voltage adjacent to the solid electrolyte layer without decreasing substantially the capacitance of the anode. These methods do not increase the breakdown voltage of the dielectric oxide film on the inner portion of the sintered anode. The thicker film on the outer surface of the sintered electrode is provided beforehand in order to avoid insulation degradation of the outer surface of the anode by chemical attack of solid electrolyte formation and by mechanical stress from external surroundings.

An object of the present invention is to provide a method of forming a tantalum oxide dielectric having improved breakdown voltage (in the case of the solid-type electrolytic capacitor) or ability to withstand re-anodization under higher voltage (in the case of the wet-type electrolytic capacitor).

Another object of the present invention is to provide a method of making a tantalum solid electrolytic capacitor having higher breakdown voltage and lower leakage current or having higher capacitance without disadvantage in breakdown voltage and leakage current.

Figure 2:
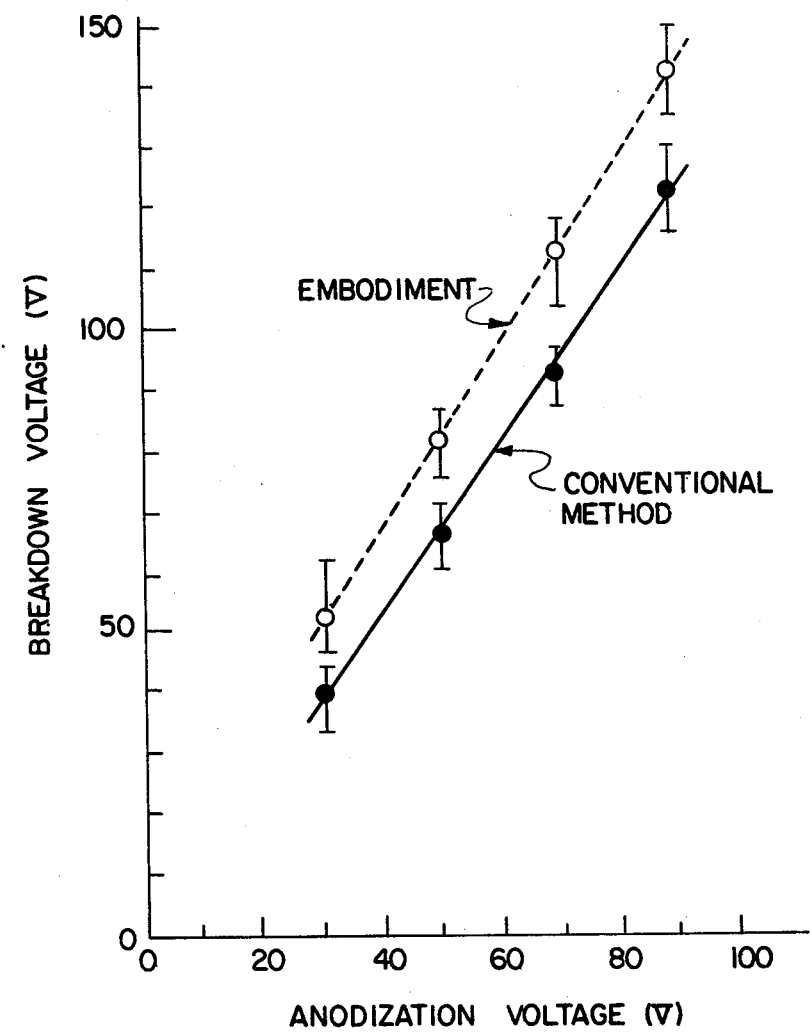

Features and advantages according to the present invention will be apparent in consideration of the below detailed description taken in conjunction with the accompanying drawings in which:

FIG. 1 shows capacitance (as a function of step-wise re-anodization voltage) of tantalum plain anode according to the present invention as compared with an anode according to the conventional anodizing method; and FIG. 2 shows breakdown voltage (as function of anodization voltage initial stage) of dielectric oxide film on a tantalum plain anode according to the present invention as compared with an anode according to the conventional anodizing method.

According to the present invention, a tantalum anode is treated anodically by applying a proper voltage to at least one fused salt selected from the group of nitrates of alkali metals, nitrates of alkaline earth metals and nitrites of alkali metals after the anode is anodized in a conventional substantially aqueous electrolyte such as phosphoric, sulphuric and nitric acids and their salts. The substantially aqueous electrolyte means an electrolyte containing water as a solvent or water with a minor part of an organic compound as a solvent. In the above description, the alkali metal is K, Na or Li, and the alkaline earth metal is Mg, Ca, Ba or Sr.

Temperature of the fused salt should be in the range 160° C. to 400° C. Too low salt temperature does not achieve improved characteristics. And, of course, in the fused salt at lower temperatures than the melting point of the salt no phenomena of interest to the present invention will occur. Too high a temperature also does not achieve the improved characteristics and causes decomposition of the salt.

The applied voltage to the anode in the fused salt treatment should be as high as possible provided that capacitance of the anode does not substantially decrease due to growth of dielectric film initially formed in the aqueous electrolyte.

Embodiments of the present invention are described below. Two sheets of tantalum plate of 0.1 mm thickness and 10 mm × 10 mm square were anodized in an 85° C. phosphoric acid solution of 1% at a formation voltage of 50 V for 2 hours. After the anodization, one of the anodized tantalum plates was immersed in a 350° C. fused salt of potassium nitrate and then anodically treated by application of a voltage of 20 volts for 10 minutes by using a counter electrode of platinum. The other anodized tantalum plate corresponds to a conventional anode.

FIG. 1 shows capacitance after re-anodization of the tantalum plate anode according to the present invention (shown by the broken line) as compared with the anode not treated in a fused salt according to the conventional method (shown by the solid line) as a function of re-anodization voltage, where re-anodization was carried out in an 85° C. phosphoric acid solution of 1% at an anodization voltage step-wise rising for a duration of 2 hours. Anode capacitance was measured in a 10% phosphoric acid solution at room temperature after each re-anodization for 2 hours. The product of capacitance and anodization voltage per unit area is called "CV product". The CV product was about 10.7 $\mu F \cdot V/cm^2$. Capacitance of the anode after being treated in a fused salt and before re-anodization is virtually equal to that of the conventional anode before re-anodization. Capacitance curve of the anode according to the present invention differs from that of the conventional anode, as shown in FIG. 1. Capacitance of the conventional anode decreases at re-anodization voltages higher than the initial anodization voltage 50 V, and then the product of re-anodization voltage (Va) and capacitance (C) corresponding to the re-anodization voltage is about constant at a value of 10.7 $\mu F \cdot V/cm^2$, which is equal to the CV product before re-anodization.

On the other hand, capacitance of the anode according to the present invention decreases at re-anodization voltages beyond 60 V which is higher than the initial anodization voltage of 50 V before being treated in a fused salt. The CVa product at 60 V is 13.2 $\mu F \cdot V/cm^2$ which is higher by 23% than 10.7 $\mu F \cdot V/cm^2$ (CVa of conventional anode). It is clear that the anode according to the present invention withstands re-anodization.

Table 1 shows CVa increase in various fused salts according to the present invention.

Furthermore, the breakdown voltage of the dielectric oxide film was measured thusly: a probe as a counter electrode made of platinum wire having round end touched the oxide film under a load of about 10 grams and positive voltage was applied to the anode metal.

FIG. 2 shows the breakdown voltage of the dielectric oxide film on the plate anode according to the present invention (shown by broken line) and conventional method (shown by solid line). The size of the plate anode was the same as described before. An anode by conventional method was formed by anodization in an 85° C. phosphoric acid solution of 1% at constant voltage application of 2 hours. An anode according to the present invention was formed as follows. An anode (after anodization by the conventional method described above) was anodically treated in a fused salt of 300° C. $KNO_3$—$NaNO_3$ (equi-weight) at an application voltage of 0.4 times the initial anodization voltage in a phosphoric acid solution. Capacitance of the anode according to the present invention was not substantially changed by the fused salt-treatment. The breakdown voltage of the dielectric oxide film according to the present invention is improved as compared with that by the conventional method, as shown in FIG. 2.

Hereinafter, a method of making a tantalum solid electrolytic capacitor according to the present invention is described on the basis of the embodiment.

Cylindrical sintered bodies of 1.6 mm in diameter and 2.0 mm in height were anodized in at 85° C. phosphoric acid solution of 0.1% for 2 hours at a voltage of 40 V in order to form a dielectric oxide film on the surface of the anode. This anodization is named A1-formation hereafter. These anodes after A1-formation were next dipped in a fused salt of nitrates, nitrites of their mixture and anodically treated by applied voltage for 10 minutes. This treatment in the fused salt is named F-formation hereafter. The anodes after F-formation were then anodically treated in an 85° C. phosphoric acid solution of 1% by applied voltage of 40 V for 30 minutes. This treatment is named A2-formation hereafter. By A2-formation, the breakdown voltage and the leakage current of the resultant solid electrolytic capacitors are further improved as compared with anodes not treated by A2-formation. Application voltage in A2-formation should be as high as possible but such that re-anodization will not occur. A manganese dioxide layer was formed on the dielectric oxide layer after A2-formation by decomposition of manganous nitrate solution as well known in the art. The manganese dioxide layer was coated with a colloidal graphite layer and then a silver paint layer was applied on the graphite layer.

Table 2 shows improvement in breakdown voltage and in leakage current of capacitors according to the present invention employing A1-formation voltage of 40 V as compared with those of capacitors by conventional anodization method using a formation voltage of 40 V. The leakage current was measured 3 minutes after application of 16 V.

Furthermore, the breakdown voltage and the leakage current of capacitors made by using a 40 V A1-formation voltage according to the present invention are equal or superior to those of capacitors made by using 50 V A1-formation voltage by the conventional method. Capacitance of capacitors according to the present invention is higher than that of capacitors according to the conventional method. Although A1-formation voltage of the present invention is 40 V in Table 2 the formation voltage is not to be limited as understood from FIG. 2. Moreover, the temperature of the fused salt is not limited to be 300° C. as understood from Table 3 described below and Table 1 already-mentioned.

Table 3 also shows improvement in breakdown voltage and leakage current of capacitors by using a 40 V and a 50 V A1 formation voltage according to the present invention as compared with those of capacitors according to the conventional method—as a function of temperature of fused salt of $KNO_3$—$NaNO_3$ (equi-weight) under almost the same conditions as in Table 2 (other than anode size of 2.8 mm in diameter and 2.8 mm in height). The difference of breakdown voltage in Table 3 from that in Table 2 under identical formation conditions is considered due to difference of anode size in Table 3 from that in Table 2 and difference of manganese dioxide formation in Table 3 from that in Table 2.

It has been described earlier in the present specification that the applied voltage in the fused salt-treatment should be as high as possible provided that significant decrease in capacitance due to oxide film growth by anodization in the fused salt does not occur. Of course, even if decrease in capacitance is caused, CVa is larger than that of conventional anodes. However, it is disadvantageous to treat anodes with such a high voltage as to cause a decrease in capacitance due to oxide film growth (by reason of promoting increase of harmful alkaline oxide content by decomposition of nitrate ion or nitrate ion—caused by oxygen being supplied). The operation time of fused salt is made shorter by this increase in alkaline oxide. For example, the breakdown voltage of a solid electrolytic capacitor according to the present invention gradually decreased at concentrations of alkaline oxide over about $1.5 \times 10^{-4}$ mol. per gram of the fused salt 300° C. $KNO_3$—$NaNO_3$ (equi-weight).

Furthermore, the applied voltage depends on temperature of the fused salt mainly and on duration of voltage application to a small extent. The application voltage must be lowered as the temperature of the fused salt increases as shown in Table 3 provided that capacitance of the anode does not substantially decrease by fused salt-treatment.

TABLE 1

| Fused salt | Treatment | | | CVa increase (%) |
|---|---|---|---|---|
| | temperature (°C.) | Voltage (V) | time (min.) | |
| $KNO_3$ | 350 | 20 | 10 | 23 |
| | 350 | 15 | 30 | 22 |
| | 400 | 20 | 10 | 18 |
| $NaNO_3$ | 350 | 20 | 10 | 24 |
| $LiNO_3$ | 350 | 20 | 10 | 22 |
| | 270 | 20 | 10 | 18 |
| $KNO_3$—$NaNO_3$ (equi-molar) | 300 | 20 | 10 | 23 |
| | 240 | 20 | 10 | 17 |
| $KNO_3$—$LiNO_3$ (mol-ratio of 3:1) | 160 | 25 | 10 | 10 |

TABLE 2

| | F-formation electrolyte (Fused salt) | Formation Voltage (V) | | | Capacitance ($\mu$F) | tan $\delta$ (%) | Leakage current (nA/$\mu$F) | Break down voltage (V) |
| --- | --- | --- | --- | --- | --- | --- | --- | --- |
| | | A1 | F | A2 | | | | |
| Conventional method | — | 50 | — | — | 5.07 | 1.3 | 2.0 | 49 |
| | — | 40 | — | — | 6.38 | 1.3 | 4.0 | 45 |
| Embodiment | 320° C. NaNO$_3$ | 40 | 14 | 40 | 6.34 | 1.3 | 1.5 | 49 |
| | 300° C. NaNO$_2$ | 40 | 16 | 40 | 6.32 | 1.3 | 1.6 | 49 |
| | 300° C. 50% NaNO$_3$—50% KNO$_3$ | 40 | 16 | 40 | 6.36 | 1.2 | 1.0 | 51 |
| | 300° C. 50% NaNO$_3$—50% Ca(NO$_3$)$_2$ | 40 | 16 | 40 | 6.38 | 1.3 | 1.9 | 49 |
| | 300° C. 50% NaNO$_3$—50% NaNO$_2$ | 40 | 16 | 40 | 6.31 | 1.3 | 1.7 | 49 |

TABLE 3

| | Temperature of F-formation (°C.) | Formation Voltage | | | Capacitance ($\mu$F) | tan $\delta$ (%) | Leakage current (nA/$\mu$F) | Break down Voltage (V) |
| --- | --- | --- | --- | --- | --- | --- | --- | --- |
| | | A1 | F | A2 | | | | |
| Conventional method | — | 50 | — | — | 23.9 | 2.4 | 2.0 | 39 |
| | — | 40 | — | — | 29.5 | 3.1 | 5.8 | 36 |
| Embodiment | 350 | 50 | 16 | 50 | 23.6 | 1.8 | 1.2 | 44 |
| | | 40 | 12.8 | 40 | 29.5 | 2.4 | 1.7 | 41 |
| | 300 | 50 | 19 | 50 | 23.9 | 1.9 | 0.94 | 45 |
| | | 40 | 15.2 | 40 | 29.6 | 2.2 | 1.5 | 43 |
| | 250 | 50 | 17.1 | 50 | 24.3 | 2.0 | 0.78 | 45 |
| | | 40 | 15.2 | 40 | 28.1 | 2.1 | 1.7 | 42 |

What is claimed is:

1. A method for making a solid tantalum electrolytic capacitor comprising:
    anodizing a tantalum sintered body for substantial dielectric film growth in a substantially aqueous electrolyte;
    anodically treating said anodized tantalum body in at least one fused salt selected from the group of nitrates of alkali metals, nitrates of alkaline earth metals and nitrites of alkali metals with an applied voltage which is as high as possible but within a range wherein capacitance-decrease of the anode formed in the aqueous electrolyte is not caused; and
    anodically treating said fused salt-treated tantalum body in a substantially aqueous electrolyte with an applied voltage which is as high as possible but within a range wherein reanodization will not occur,
    wherein the temperature of said fused salt is in the range of 250° C. to 350° C., and the concentration of alkaline oxide in said fused salt is less than $1.5 \times 10^{-4}$ mol. per gram of said fused salt.

2. A method for making a solid electrolytic capacitor according to claim 1, wherein said alkali metal is selected from Na, K and Li, and said alkaline earth metal is selected from Mg, Ca, Ba and Sr.

3. A method for making a solid electrolytic capacitor according to claim 1, wherein said fused salt is a mixture of KNO$_3$ and NaNO$_3$.

* * * * *